(12) United States Patent
Niga et al.

(10) Patent No.: US 10,917,580 B2
(45) Date of Patent: Feb. 9, 2021

(54) CONTROL APPARATUS, IMAGING APPARATUS, AND STORAGE MEDIUM

(71) Applicant: CANON KABUSHIKI KAISHA, Tokyo (JP)

(72) Inventors: Shota Niga, Kawasaki (JP); Shoichi Yamazaki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/710,800

(22) Filed: Dec. 11, 2019

(65) Prior Publication Data

US 2020/0213523 A1 Jul. 2, 2020

(30) Foreign Application Priority Data

Dec. 27, 2018 (JP) ................................ 2018-244128

(51) Int. Cl.
*H04N 5/232* (2006.01)

(52) U.S. Cl.
CPC ..... *H04N 5/23299* (2018.08); *H04N 5/23206* (2013.01); *H04N 5/232123* (2018.08); *H04N 5/232127* (2018.08)

(58) Field of Classification Search
CPC ......... H04N 5/23299; H04N 5/232127; H04N 5/232123; H04N 5/23206; H04N 5/232933; H04N 5/232945; H04N 5/23296
USPC ...................................................... 348/345
See application file for complete search history.

(56) References Cited

U.S. PATENT DOCUMENTS

| | | | | |
|---|---|---|---|---|
| 8,564,693 | B2* | 10/2013 | Makii | G06T 7/571 348/239 |
| 9,858,649 | B2* | 1/2018 | Liang | G06T 7/11 |
| 10,341,567 | B2* | 7/2019 | Ito | H04N 5/23212 |
| 10,425,577 | B2* | 9/2019 | Abe | H04N 5/2356 |
| 10,552,947 | B2* | 2/2020 | Liang | G06T 7/11 |
| 2010/0103311 | A1* | 4/2010 | Makii | H04N 5/2628 348/369 |
| 2016/0323504 | A1* | 11/2016 | Ono | H04N 5/2251 |
| 2017/0091906 | A1* | 3/2017 | Liang | G06T 7/11 |
| 2017/0272658 | A1* | 9/2017 | Ito | G02B 7/38 |
| 2017/0280045 | A1* | 9/2017 | Nonaka | H04N 5/23212 |
| 2018/0082144 | A1* | 3/2018 | Wakamatsu | G06K 9/3241 |

(Continued)

FOREIGN PATENT DOCUMENTS

| | | |
|---|---|---|
| JP | 2012141516 A | 7/2012 |
| JP | 2017173802 A | 9/2017 |

*Primary Examiner* — Pritham D Prabhakher
(74) *Attorney, Agent, or Firm* — Carter, DeLuca & Farrell LLP

(57) ABSTRACT

A control apparatus includes a setting unit that sets an evaluation area in an image, and an angle control unit that adjusts a tilt angle based on an evaluation value in the evaluation area. The setting unit sets a first evaluation area relating to a first object, a second evaluation area relating to a second object closer than the first object, and a first partial evaluation area and a second partial evaluation area both of which are obtained by dividing the second evaluation area. The angle control unit adjusts the tilt angle so as to increase a sum of a first evaluation value in the first evaluation area and a second evaluation value in the second evaluation area, and sets the tilt angle based on a third evaluation value in the first partial evaluation area and a fourth evaluation value in the second partial evaluation area.

13 Claims, 7 Drawing Sheets

(56) References Cited

U.S. PATENT DOCUMENTS

2018/0082405 A1\* 3/2018 Liang .................. G06F 3/04842
2019/0075284 A1\* 3/2019 Ono ........................ H04N 7/18

\* cited by examiner

CONTROL APPARATUS, IMAGING APPARATUS, AND STORAGE MEDIUM

BACKGROUND OF THE INVENTION

Field of the Invention

The present invention relates to a control unit that performs a tilt control.

Description of the Related Art

Conventionally, in order to obtain an image with a deep depth of field, there has been a method of adjusting a focal plane (adjusting a tilt angle) by tilting an imaging plane relative to an imaging optical axis plane that is orthogonal to an imaging optical axis used to image an object.

Japanese Patent Application Laid-Open No. ("JP") 2017-173802 discloses a technique for widening a depth-of-field range by detecting a focus shift amount among a plurality of focus detection areas and by adjusting an image sensor to an optimum tilt angle based on the focus shift amount. JP2012-141516 discloses a technique for widening the depth-of-field range by selecting a candidate area for an in-focus control from a plurality of focus detection areas, and by adjusting the image sensor to the optimum tilt angle based on the evaluation result of the candidate area.

In adjusting the tilt angle, a blur which is peculiar to the tilt would appear in an (upper or lower) part of a short-distance object. For example, when a telephoto lens of a shallow depth of field is used, the blur peculiar to the tilt appears in the (upper or lower) part of the short-distance object before the depth-of-field from a short-distance object to a long-distance object is expanded by adjusting the tilt angle. None of the methods disclosed in JPs 2017-173802 and 2012-141516 suppress the blur peculiar to the tilt which appears in the short-distance object when expanding the depth-of-field by adjusting the tilt angle.

SUMMARY OF THE INVENTION

The present invention provides a control apparatus, an imaging apparatus, and a storage medium, each of which can suppress a blur which appears when adjusting a tilt angle.

A control apparatus as one aspect of the present invention includes a setting unit configured to set an evaluation area in an image, and an angle control unit configured to adjust a tilt angle based on an evaluation value in the evaluation area. The setting unit sets a first evaluation area which relates to a first object, a second evaluation area which relates to a second object that is closer than the first object, and a first partial evaluation area and a second partial evaluation area both of which are obtained by dividing the second evaluation area. The angle control unit adjusts the tilt angle so as to increase a sum of a first evaluation value in the first evaluation area and a second evaluation value in the second evaluation area. The angle control unit sets the tilt angle based on a third evaluation value in the first partial evaluation area and a fourth evaluation value in the second partial evaluation area. At least one processor or circuit is configured to perform a function of at least one of the units.

An imaging apparatus including the above control apparatus, and a storage medium storing a computer program that enables a computer to execute a control method corresponding the control apparatus also constitute another aspect of the present invention.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

First Embodiment

Figure 1:
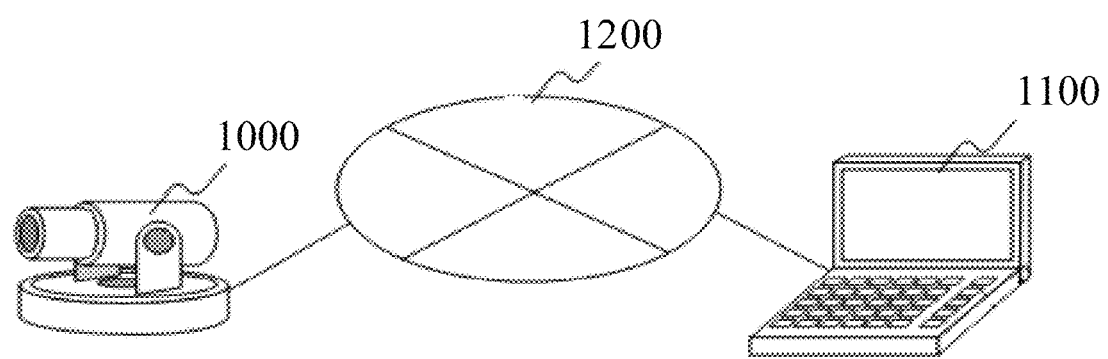
FIG. 1 explains a configuration of a network camera system according to this embodiment.

FIG. 1 explains a configuration of a network camera system according to this embodiment. FIG. 1 is a configuration diagram of a network camera system (surveillance camera system) 100 according to this embodiment. Reference numeral 1000 denotes a surveillance camera (network camera), reference numeral 1100 denotes a video control apparatus (client apparatus) of the surveillance camera 1000, and reference numeral 1200 denotes a network. The surveillance camera 1000 and the video control apparatus 1100 are connected to each other through the network 1200 so that they can communicate with each other. The video control apparatus 1100 transmits various commands to the surveillance camera 1000. The surveillance camera 1000 transmits responses to those commands to the video control apparatus 1100.

Figure 2:
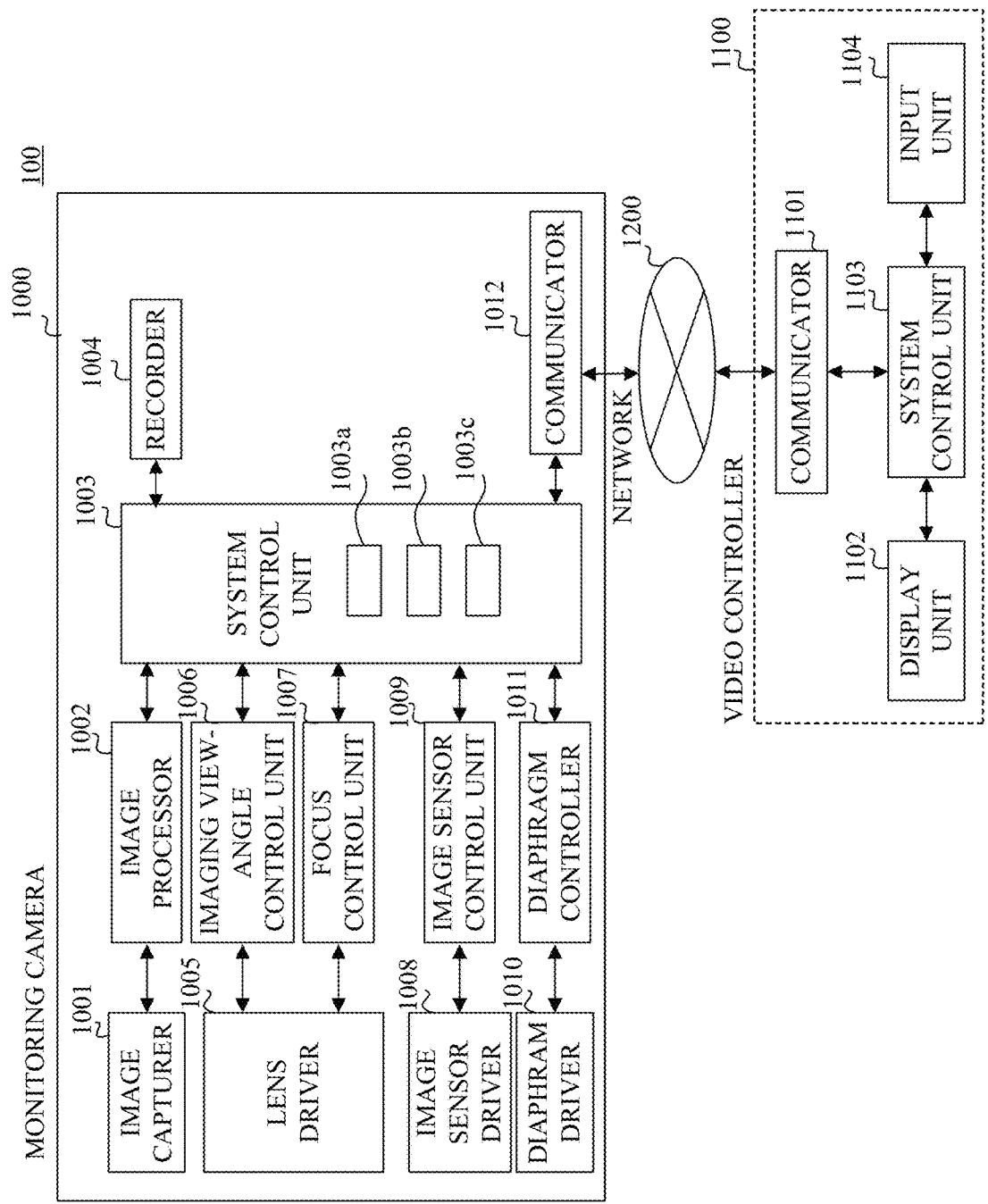
FIG. 2 is a block diagram of a network camera system according to this embodiment.

Referring now to FIG. 2, a description will be given of the configuration and functions of the network camera system 100. FIG. 2 is a block diagram of the system 100. Firstly, the configuration and the function of the surveillance camera 1000 is to be described. The surveillance camera 1000 includes an image capturer 1001, an image processor 1002, a system control unit (control apparatus) 1003, and a recorder 1004. The surveillance camera 1000 includes a lens driver 1005, an imaging view-angle control unit 1006, a focus control unit 1007, an image sensor driver 1008, an image sensor control unit 1009, a diaphragm driver 1010, a diaphragm controller 1011, and a communicator 1012.

The image capturer 1001 includes a lens (imaging optical system) and an image sensor. The image sensor photoelectrically converts an object image (optical image) which is formed through the lens and outputs an image signal. The image processor 1002 performs predetermined image processing and compression encoding processing for the image signal which is output from the image capturer 1001 to generate video data (image data).

The system control unit 1003 analyzes a camera control command (control command) transmitted from the video control apparatus 1100 and performs processing according to the command. The system control unit 1003 mainly receives a live-view image request command from the video control apparatus 1100 and distributes the video data which is generated by the image processor 1002 via the communicator 1012. In addition, the system control unit 1003 receives request commands of a zoom setting value, a focus setting value, a tilt angle setting value, and a diaphragm setting value of the surveillance camera 1000 from the video control apparatus 1100. Then, the system control unit 1003 reads each setting value from the imaging view-angle control unit 1006, the focus control unit 1007, the image sensor control unit 1009, and the diaphragm controller 1011, and distributes these setting values via the communicator 1012. The system control unit 1003 receives zoom, focus, tilt angle, and diaphragm setting commands from the video control apparatus 1100. At that time, the system control unit 1003 commands the imaging view-angle control unit 1006, the focus control unit 1007, the image sensor control unit 1009, and the diaphragm controller 1011 to control the lens driver 1005, the image sensor driver 1008, and the diaphragm driver 1010 based on those set values. As a result, the setting values relating to the zoom, focus, tilt angle, and diaphragm which are set in the video control apparatus 1100 are reflected in the surveillance camera 1000.

In this embodiment, the system control unit 1003 includes a setting unit 1003a, an angle control unit 1003b, and a diaphragm control unit 1003c. The setting unit 1003a sets an evaluation area (contrast evaluation area) in an image (captured image). The angle control unit 1003b adjusts the tilt angle via the image sensor control unit 1009 and the image sensor driver 1008 based on the evaluation value (contrast evaluation value) of the evaluation area. The diaphragm control unit 1003c controls the diaphragm (aperture stop) via the diaphragm controller 1011 and the diaphragm driver 1010.

The recorder 1004 records images in an internal or external storage. The imaging view-angle control unit 1006 commands the lens driver 1005 to change the zoom lens position based on the zoom setting value which is transmitted from the system control unit 1003. The focus control unit 1007 commands the lens driver 1005 to change the focus lens position based on the focus setting value which is transmitted from the system control unit 1003. The image sensor control unit 1009 commands the image sensor driver 1008 to change the image sensor tilt angle based on the setting value of the tilt angle which is transmitted from the system control unit 1003. The diaphragm controller 1011 commands the diaphragm driver 1010 to change the F-number based on the diaphragm setting value transmitted from the system control unit 1003.

The communicator 1012 distributes the video data to the video control apparatus 1100 via the network 1200. The communicator 1012 receives various commands which are transmitted from the video control apparatus 1100 and transmits them to the system control unit 1003. The commands that are transmitted from the video control apparatus 1100 mainly include a live-view image request command, a request command for the setting values relating to the zoom, focus, tilt angle, and diaphragm of the surveillance camera 1000, and a setting command.

Next follows a description of the configuration and function of the video control apparatus 1100. The video control apparatus 1100 is typically a general-purpose computer, such as a personal computer. A communicator 1101 transmits various commands which the image control unit issues 1100, and receives various data which the surveillance camera 1000 distributes. The various commands mainly include a request command for a live-view image, the zoom, focus, tilt angle, and diaphragm setting value request commands of the surveillance camera 1000, and the zoom, focus, tilt angle, and diaphragm setting commands of the surveillance camera 1000. The various data mainly include information relating to the imaging view-angle including the zoom, information relating to the focus, information relating to the tilt, information relating to the diaphragm, video data and the like of the surveillance camera 1000.

A display unit 1102 is a liquid crystal display apparatus or the like, and displays an image acquired from the surveillance camera 1000 and a GUI for performing a camera control. A system control unit 1103 generates a camera control command in response to a user operation (GUI operation) and transmits the camera control command to the surveillance camera 1000 via the communicator 1101. The system control unit 1103 displays, on the display unit 1102, the video data which is received from the surveillance camera 1000 via the communicator 1101, and data which represents the setting values of the imaging view-angle including the zoom, focus, tilt angle, and diaphragm. An input unit 1104 uses a pointing apparatus such as a keyboard and a mouse, and a user of the client apparatus operates the GUI via the input unit 1104.

Figure 3:
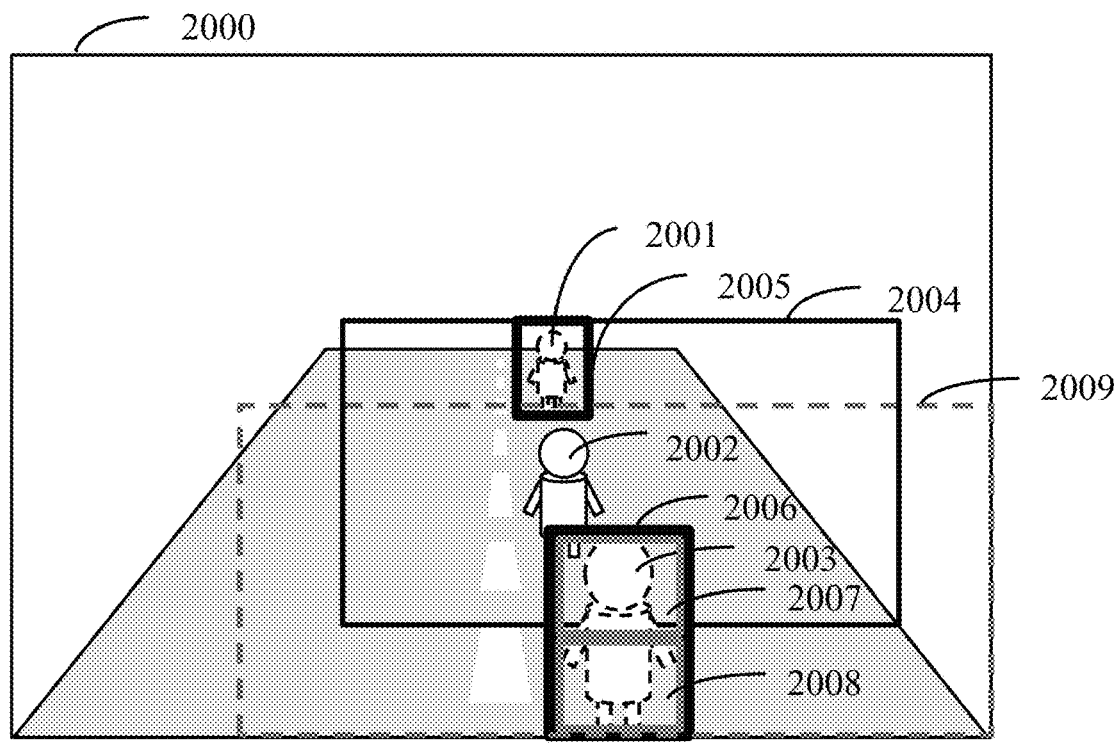
FIG. 3 illustrates an in-focus plane and blur levels peculiar to the tilt of long-distance and short-distance objects when a tilt angle of a surveillance camera according to this embodiment is 0 degree.

Referring now to FIGS. 3 to 6, a description will be given of a captured image of the surveillance camera 1000. FIG. 3 illustrates the in-focus plane and blur levels peculiar to the tilt of the long-distance and short-distance objects when the tilt angle of the surveillance camera 1000 is 0 degree.

In FIG. 3, reference numeral 2000 denotes a captured image by the surveillance camera 1000, reference numeral 2001 denotes a long-distance object (first object), reference numeral 2002 denotes a center object, reference numeral 2003 denotes a short-distance object (second object), and reference numeral 2004 denotes an in-focus plane. Reference numeral 2005 denotes a contrast evaluation area (first evaluation area) of the long-distance object 2001, and reference numeral 2006 denotes a contrast evaluation area (second evaluation area) of the short-distance object 2003. Reference numeral 2007 denotes an upper contrast evaluation area (first partial evaluation area) of the short-distance object 2003, and reference numeral 2008 denotes a lower contrast evaluation area (second partial evaluation area) of the short-distance object 2003. Reference numeral 2009 denotes a vertical plane of the short-distance object 2003. Herein, the contrast evaluation area 2005 of the long-distance object 2001 and the contrast evaluation area 2006 of the short-distance object 2003 are set manually by the user input via the input unit 1104 or automatically by the system control unit 1003. The upper contrast evaluation area 2007 and the lower contrast evaluation area 2008 of the short-distance object 2003 are evaluation areas which are obtained by vertically dividing the contrast evaluation area 2006 of the near-distance object 2003 into two, and automatically set by the system control unit 1003. The vertical plane 2009 of the short-distance object 2003 is a vertical plane including the contrast evaluation area 2006 of the short-distance object 2003.

In FIG. 3, the in-focus plane 2004 represents the in-focus state on the center object 2002 when the tilt angle is 0 degree. FIG. 3 illustrates a state where the long-distance object 2001 and the short-distance object 2003 are out of focus. Thus, in the state where the tilt angle is 0 degree, the contrast evaluation value is low in each of the contrast evaluation area 2005 of the long-distance object 2001, the upper contrast evaluation area 2007, and the lower contrast evaluation area 2008 of the short-distance object 2003.

Figure 4:
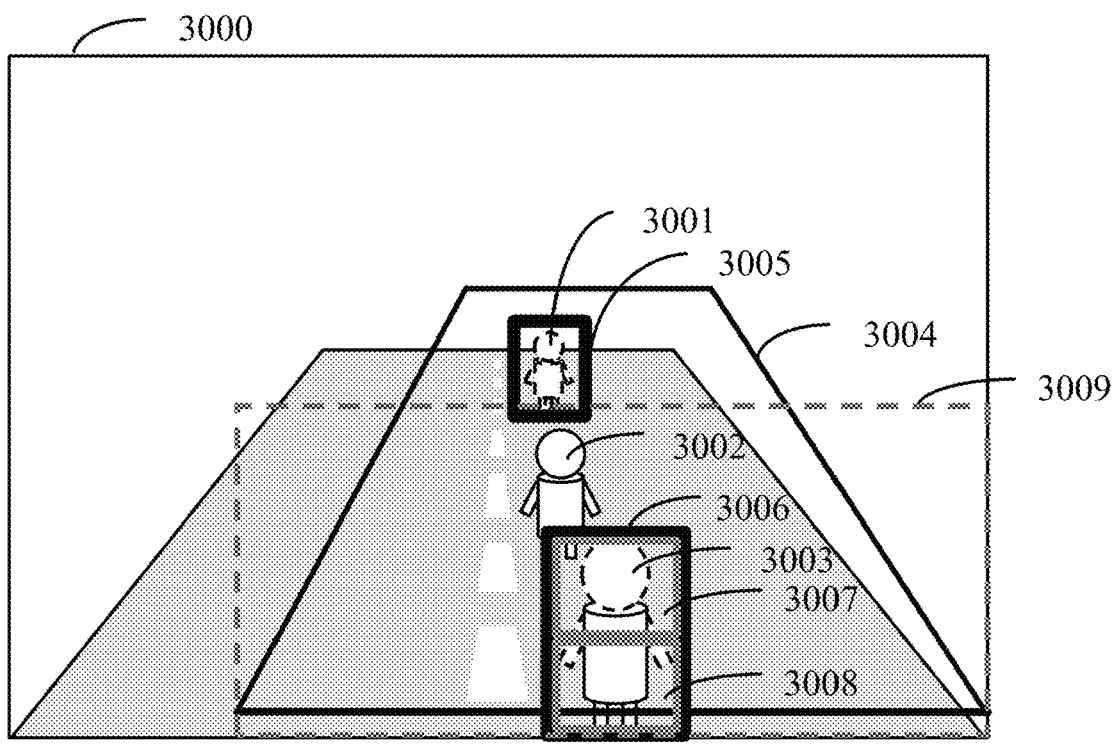
FIG. 4 illustrates the in-focus plane and blur levels peculiar to the tilt of the long-distance and short-distance objects before the tilt angle of the surveillance camera according to this embodiment reaches a proper tilt angle.

FIG. 4 illustrates the in-focus plane and the blur levels peculiar to the tilt of the long-distance and short-distance objects before the tilt angle of the surveillance camera 1000 reach the proper tilt angle. In FIG. 4, reference numeral 3000 denotes the captured image of the surveillance camera 1000, reference numeral 3001 denotes the long-distance object, reference numeral 3002 denotes the center object, reference numeral 3003 denotes the short-distance object, and reference numeral 3004 denotes the in-focus plane. Reference numeral 3005 denotes the contrast evaluation area of the long-distance object 3001, reference numeral 3006 denotes the contrast evaluation area of the short-distance object 3003, reference numeral 3007 denotes the upper contrast evaluation area of the short-distance object 3003, and reference numeral 3008 denotes the lower contrast evaluation area of the short-distance object 3003. Reference numeral 3009 denotes the vertical plane of the short-distance object 3003. The vertical plane 3009 of the short-distance object 3003 is the vertical plane including the contrast evaluation area 3006 of the short-distance object 3003.

In FIG. 4, the in-focus plane 3004 is tilted around the center object 3002 by adjusting the tilt angle. The tilt angle is an angle before reaching the proper tilt angle, and is in a state where the in-focus plane does not correspond to the long-distance object 3001. The in-focus plane corresponds to the lower part of the short-distance object 3003, but not correspond to the upper part. Therefore, at the tilt angle before reaching the proper tilt angle, the contrast evaluation value is low in the contrast evaluation area 3005 of the long-distance object 3001 and the upper contrast evaluation area 3007 of the short-distance object 3003. On the other hand, the contrast evaluation value is high in the lower contrast evaluation area 3008 of the short-distance object 3003.

Figure 5:
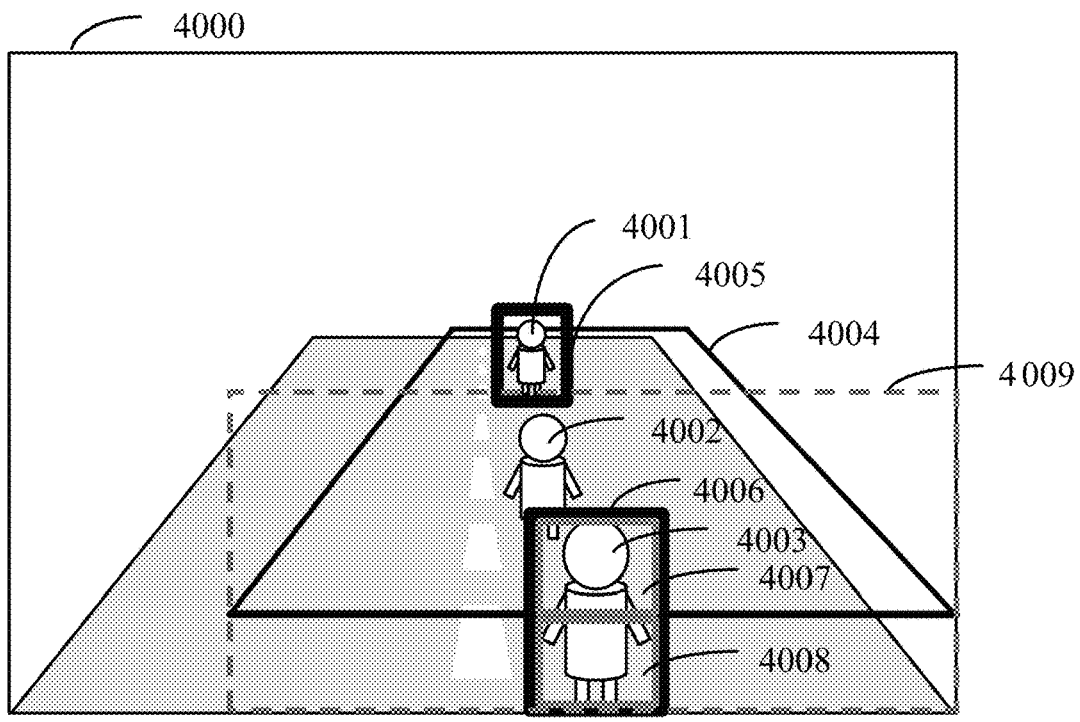
FIG. 5 illustrates the in-focus plane and blur levels peculiar to the tilt of the long-distance and short-distance objects when the tilt angle of the surveillance camera according to this embodiment is a proper tilt angle.

FIG. 5 illustrates the in-focus plane and blur levels peculiar to the tilt of the long-distance and short-distance objects when the tilt angle of the surveillance camera 1000 is the proper tilt angle. In FIG. 5, reference numeral 4000 denotes a captured image of the surveillance camera 1000, reference numeral 4001 denotes the long-distance object, reference numeral 4002 denotes the center object, reference numeral 4003 denotes the short-distance object, and reference numeral 4004 denotes the in-focus plane. Reference numeral 4005 denotes the contrast evaluation area of the long-distance object 4001, reference numeral 4006 denotes the contrast evaluation area of the short-distance object 4003, reference numeral 4007 denotes the upper contrast evaluation area of the short-distance object 4003, and reference numeral 4008 denotes the lower contrast evaluation area of the short-distance object 4003. Reference numeral 4009 denotes the vertical plane of the short-distance object 4003. The short-distance object vertical plane 4009 is the vertical plane including the contrast evaluation area 4006 of the short-distance object.

The proper tilt angle is the tilt angle that minimizes the blur peculiar to the tilt and appears in the short-distance object 4003. In this embodiment, the proper tilt angle is the tilt angle finally set to the image sensor driver 1008 by the system control unit 1003 via the image sensor control unit 1009. In FIG. 5, in the proper tilt angle, the focal planes corresponds to both the long-distance object 4001 and the upper and lower parts of the short-distance object 4003. Therefore, in the proper tilt angle state, the contrast evaluation value is high in the contrast evaluation area 4005 of the long-distance object 4001, the upper contrast evaluation area 4007 of the short-distance object 4003, and the lower contrast evaluation area 4008 of the short-distance object 4003.

Figure 6:
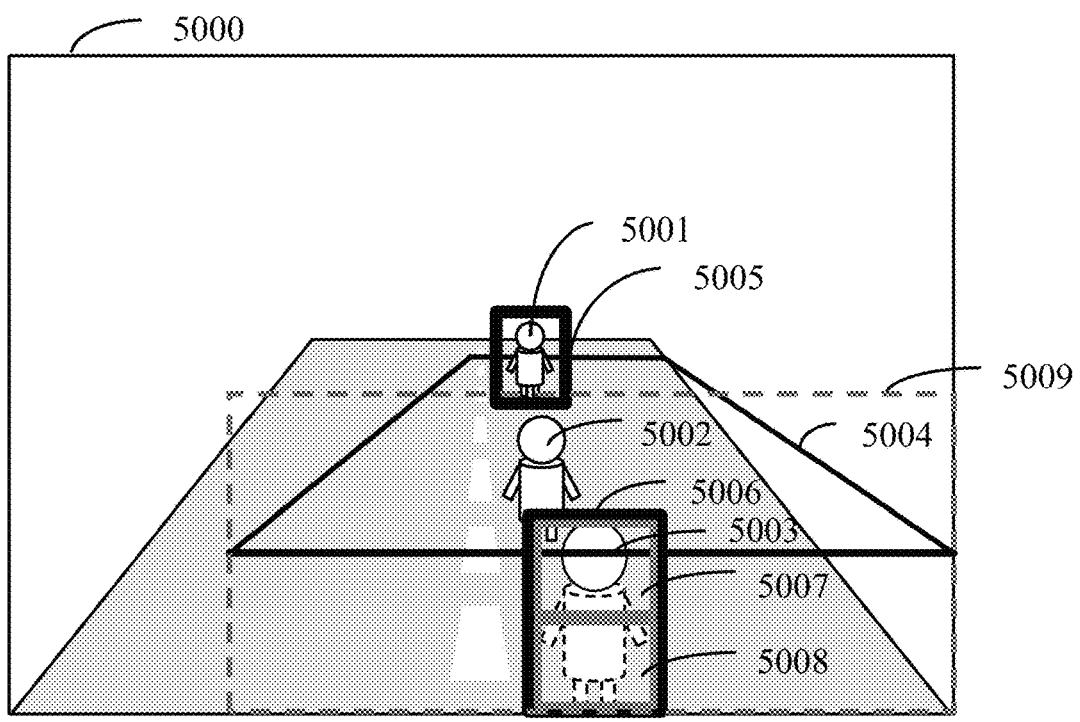
FIG. 6 illustrates the in-focus plane and blur levels peculiar to the tilt of the long-distance and short-distance objects when the tilt angle of the surveillance camera according to this embodiment exceeds the proper tilt angle.

FIG. 6 illustrates the in-focus plane and blur levels peculiar to the tilt of the long-distance and short-distance objects when the tilt angle of the surveillance camera 1000 exceeds the proper tilt angle. In FIG. 6, reference numeral 5000 denotes the captured image by the surveillance camera 1000, reference numeral 5001 denotes the long-distance object, reference numeral 5002 denotes the center object, reference numeral 5003 denotes the short-distance object, and reference numeral 5004 denotes the in-focus plain. Reference numeral 5005 denotes the contrast evaluation area of the long-distance object 5001, reference numeral 5006 denotes the contrast evaluation area of the short-distance object 5003, reference numeral 5007 denotes the upper contrast evaluation area of the short-distance object 5003, and reference numeral 5008 denotes the lower contrast evaluation area of the short-distance object 5003. Reference numeral 5009 denotes the vertical plane of the short-distance object 5003. The vertical plane 5009 of the short-distance object 5003 is a vertical plane including the contrast evaluation area 5006 of the short-distance object 5003.

In FIG. 6, when the tilt angle exceeds the proper tilt angle, the in-focus plane 5004 further tilts around the center object 5002. As a result, the in-focus plane corresponds to the long-distance object 5001 and the upper part of the short-distance object 5003, but the in-focus plane does not correspond to the lower part of the short-distance object 5003. Therefore, when the tilt angle exceeds the proper tilt angle, the contrast evaluation value is high in the contrast evaluation area 5005 of the long-distance object 5001 and the upper contrast evaluation area 5007 of the short-distance object 5003. On the other hand, in the lower contrast evaluation area 5008 of the short-distance object 5003, the contrast evaluation value is low.

Figure 7:
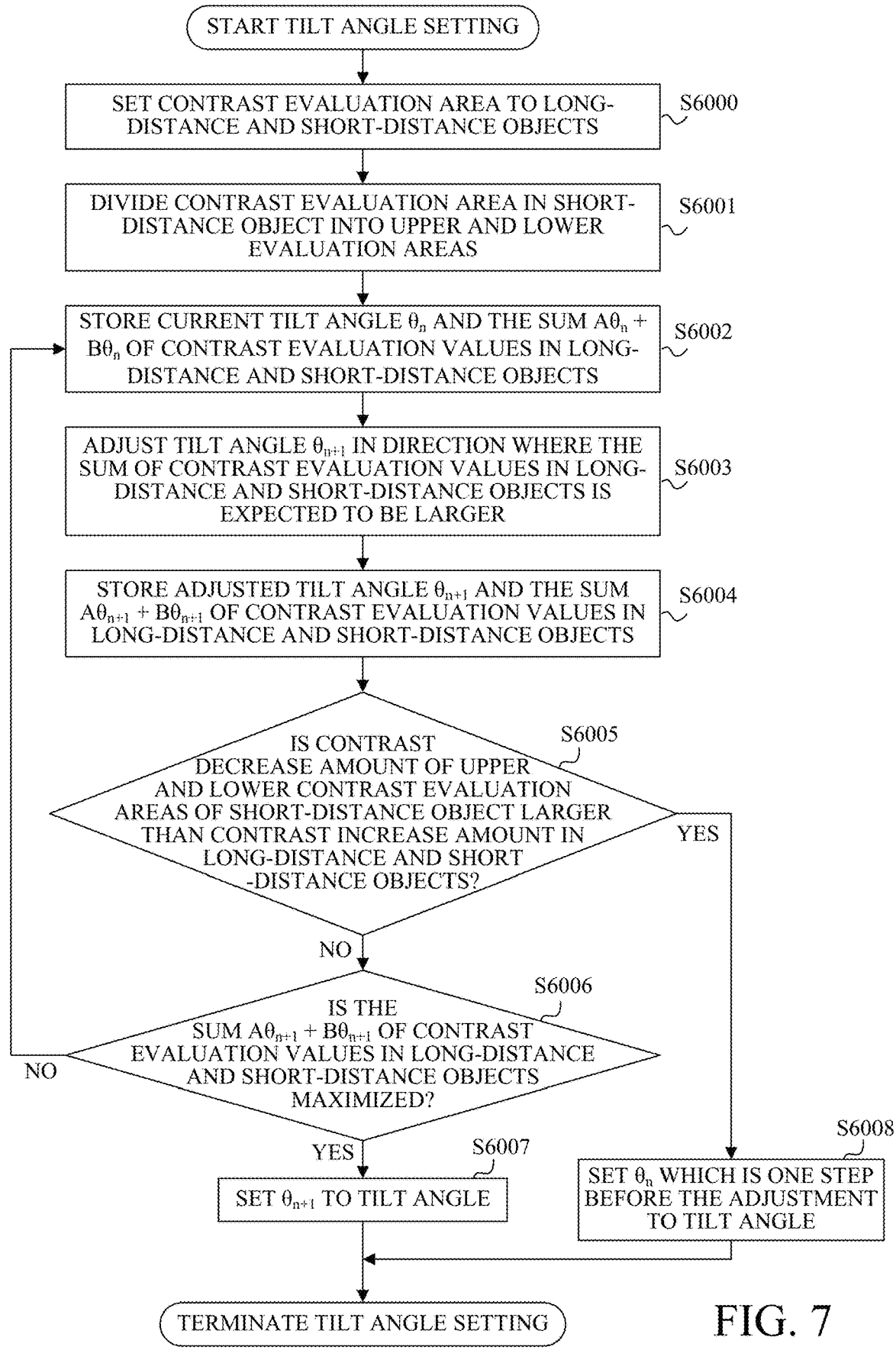
FIG. 7 is a flowchart illustrating setting processing of a proper tilt angle according to a first embodiment.

Referring now to FIG. 7, a description will be given of the setting processing of the proper tilt angle in the surveillance camera 1000. FIG. 7 is a flowchart illustrating setting processing of the proper tilt angle. The system control unit 1003 mainly execute each step in FIG. 7.

Initially, in the step S6000, the system control unit 1003 sets the contrast evaluation area 2005 to the long-distance object 2001 and the contrast evaluation area 2006 to the short-distance object 2003, respectively. The setting method of the contrast evaluation areas 2005 and 2006 may be either a manual setting by the user via the input unit 1104 or an automatic setting by the surveillance camera 1000.

In the step S6001, the system control unit 1003 divides the contrast evaluation area 2006 of the short-distance object 2003 into two parts which are the upper contrast evaluation area 2007 and the lower contrast evaluation area 2008. Now assume that the number of adjustments of the tilt angle is n, and the contrast evaluation values in the contrast evaluation areas 2005, 2006, 2007, and 2008 at the current tilt angle $\theta_n$ are $A\theta_n$, $B\theta_n$, $U\theta_n$ and $L\theta_n$, respectively. The calculation method of the contrast evaluation value in each contrast evaluation area is not limited.

In the step S6002, the system control unit 1003 stores the current tilt angle $\theta_n$ and the sum $A\theta_n+B\theta_n$ of the contrast evaluation values in the contrast evaluation areas 2005 and 2006 of the long-distance and short-distance objects. Next, in the step S6003, the system control unit 1003 adjusts the tilt angle in a direction where the sum of the contrast evaluation values in the contrast evaluation areas 2005 and 2006 become larger (a direction where the contrast evaluation values are expected to be larger). The number of adjustments of the tilt angle is n+1, and the system control unit 1003 sets the tilt angle of the image sensor driver 1008 to $\theta_{n+1}$ via the image sensor control unit 1009. In the step S6004, the system control unit 1003 stores the adjusted tilt angle $\theta_{n+1}$ and the sum $A\theta_{n+1}+B\theta_{n+1}$ of the contrast evaluation values in the contrast evaluation areas 2005 and 2006 of the long-distance and short-distance objects.

In the step S6005, the system control unit 1003 calculates the contrast increase amount $(A\theta_{n+1}-A\theta_n)+(B\theta_{n+1}-B\theta_n)$ of the contrast evaluation areas 2005 and 2006 of the long-distance and short-distance objects. In addition, the system control unit 1003 calculates the amount of contrast decrease amount $(U\theta_n-U\theta_{n+1})+(L\theta_n-L\theta_{n+1})$ in the upper and lower contrast evaluation areas 2007 and 2008 of the short-distance object. The system control unit 1003 uses the following expressions (1) to (3) to determine whether or not the contrast decrease amount $(U\theta_n-U\theta_{n+1})+(L\theta_n-L\theta_{n+1})$ is larger than the contrast increase amount $(A\theta_{n+1}-A\theta_n)+(B\theta_{n+1}-B\theta_n)$.

$$(U\theta_n-U\theta_{n+1})+(L\theta_n-L\theta_{n+1})>(A\theta_{n+1}-A\theta_n)+(B\theta_{n+1}-B\theta_n) \quad (1)$$

$$(U\theta_n-U\theta_{n+1})+(L\theta_n-L\theta_{n+1})>0 \quad (2)$$

$$(A\theta_{n+1}-A\theta_n)+(B\theta_{n+1}-B\theta_n)>0 \quad (3)$$

The expression (1) is a discriminant for determining whether or not the contrast decrease amount $(U\theta_n-U\theta_{n+1})+(L\theta_n-L\theta_{n+1})$ is larger than the contrast increase amount $(A\theta_{n+1}-A\theta_n)+(B\theta_{n+1}-B\theta_n)$. The expression (2) is a discriminant for determining whether or not the contrast evaluation value is reduced in the upper and lower contrast evaluation areas 2007 and 2008 of the short-distance object. The expression (3) is a discriminant for determining whether or not the contrast evaluation value is increased in the contrast evaluation areas 2005 and 2006 of the long-distance and short-distance objects. If any one of the expressions (1) to (3) is not satisfied, the flow proceeds to the step S6006. If all of the expressions (1) to (3) are satisfied, the flow proceeds to the step S6008.

In the step S6006, the system control unit 1003 determines whether or not the sum $A\theta_{n-1}+B\theta_{n+1}$ of the contrast evaluation values in the contrast evaluation areas 2005 and 2006 of the long-distance and short-distance objects gets maximized using the following expression (4).

$$|(A\theta_{n+1}+B\theta_{n+1})-(A\theta_n+B\theta_n)|<t_1 \quad (4)$$

In the expression (4), $t_1$ is a contrast variation amount threshold value (first threshold value) that is a terminate condition for the tilt angle adjustment. The threshold $t_1$ is a positive real value close to 0 and is determined empirically. As in the expression (4), it is determined whether or not an absolute value of a difference is smaller than the threshold $t_1$ where the difference is between the sum $A\theta_{n-1}+B\theta_{n+1}$ of the contrast evaluation values at the tilt angle $\theta_{n+1}$ and the sum $A\theta_n+B\theta_n$ of the contrast evaluation values at the tilt angle $\theta_n$ which has not changed to $\theta_{n+1}$ yet. If the expression (4) is satisfied, the system control unit 1003 considers that the sum $A\theta_{n+1}+B\theta_{n+1}$ of the contrast evaluation values has been maximized, and proceeds to the step S6007. If the expression (4) is not satisfied, the flow proceeds to the step S6002. In the step S6002, the system control unit 1003 sets the next $\theta_n$ to $\theta_{n+1}$, and repeats the processing of the steps S6002 to S6005 until the conditions of the steps S6005 and S6006 are satisfied.

In the step S6007, the system control unit 1003 determines as the proper tilt angle the tilt angle $\theta_{n+1}$ that maximizes the sum of the contrast evaluation values in the contrast evaluation areas 2005 and 2006 of the long-distance and short-distance objects. The system control unit 1003 sets the tilt angle of the image sensor driver 1008 to $\theta_{n+1}$ via the image sensor control unit 1009, and terminates the tilt angle setting processing.

In the step S6008, the system control unit 1003 determines as the proper tilt angle the tilt angle $\theta_n$ before changing the tilt angle to $\theta_{n+1}$. The system control unit 1003 sets the tilt angle of the image sensor driver 1008 to $\theta_n$ via the image sensor control unit 1009, and terminates the tilt angle setting processing.

In this embodiment, the surveillance camera 1000 sets the upper and lower contrast evaluation areas which are obtained by vertically dividing the contrast evaluation area of the short-distance object, in addition to the contrast evaluation areas of the long-distance and short-distance objects. The system control unit 1003 adjusts the tilt angle of the image sensor (image capturer 1001) in the direction that maximizes the sum of the contrast evaluation values in the contrast evaluation areas 2005 and 2006 of the long-distance and short-distance objects. When the sum of the contrast evaluation values is maximized, the system control unit 1003 determines the tilt angle at that time as the proper tilt angle.

At this time, the system control unit 1003 compares the contrast increase amount of the contrast evaluation areas 2005 and 2006 of the long-distance and short-distance objects with the contrast decrease amount of the upper and lower contrast evaluation areas 2007 and 2008 of the short-distance object. If the contrast decrease amount of the contrast evaluation areas 2007 and 2008 is larger than the contrast increase amount of the contrast evaluation areas 2005 and 2006, the tilt angle one step before the adjustment to current tilt angle is determined as the proper tilt angle. Thereby, the tilt angle can be automatically set that suppresses the blur peculiar to the tilt which appears in the short-distance object 2003.

In this embodiment, the contrast evaluation area of the short-distance object can be divided in an arbitrary direction including the vertical or horizontal direction with respect to the captured image. This embodiment can compare the contrast increase amount of the contrast evaluation areas 2005 and 2006 of the long-distance object and short-distance objects with the contrast decrease amount of the contrast evaluation area divided in the arbitrary direction. Thereby, it is possible to automatically set the tilt angle that suppresses the blur peculiar to the tilt which appears in the short-distance object 2003 in consideration of the contrast decrease amount of the contrast evaluation area which are divided in the arbitrary direction.

Second Embodiment

This embodiment is different from the first embodiment in proper tilt angle setting processing of the surveillance camera 1000. In other words, in this embodiment, in the surveillance camera 1000, when the contrast evaluation values in the contrast evaluation areas which are obtained by dividing the short-distance object have equal ratios, the tilt angle at that time is determined as the proper tilt angle. Thereby, it is possible to automatically set the tilt angle that suppresses the blur peculiar to the tilt which appears in the short-distance object.

Figure 8:
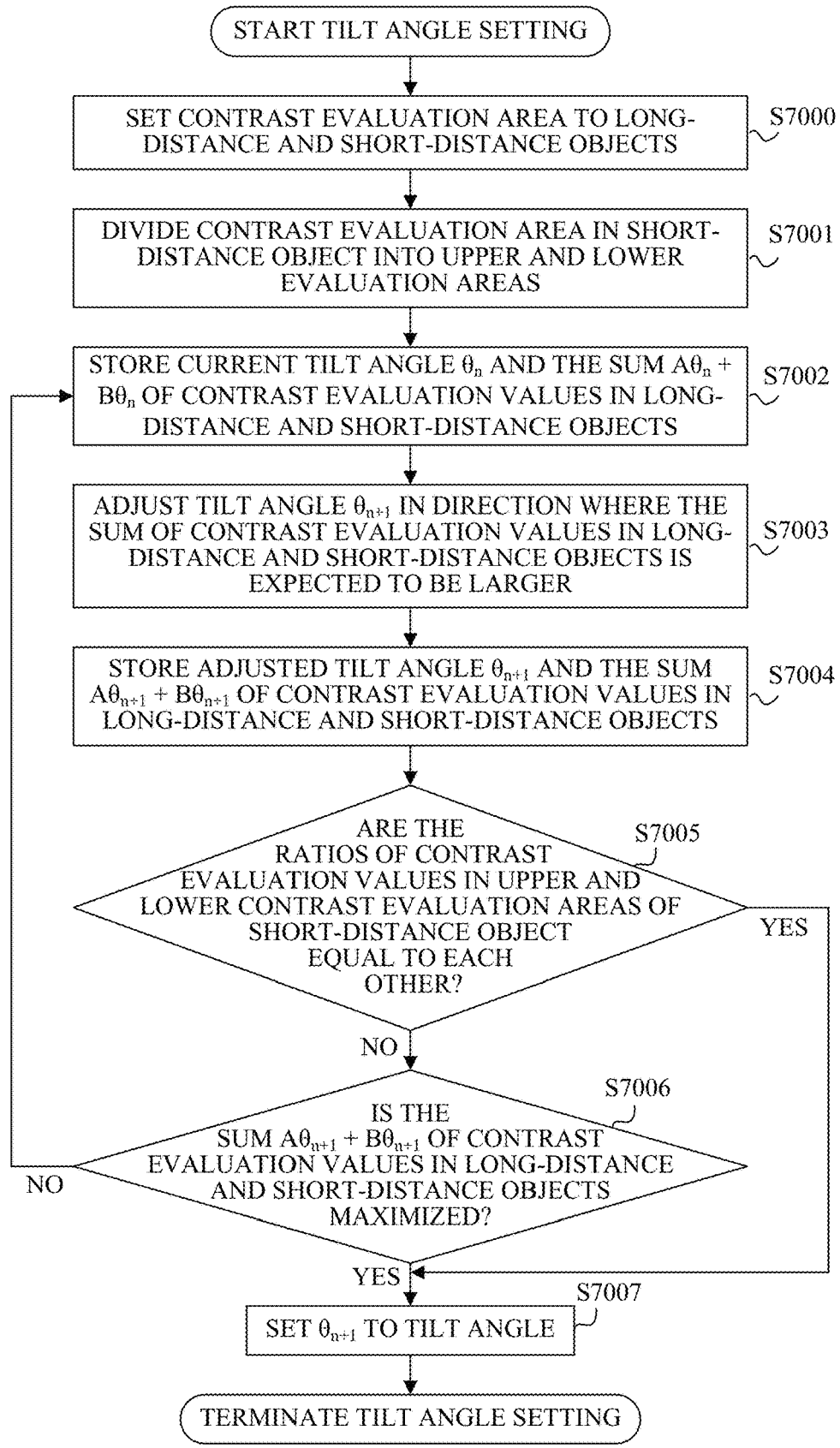
FIG. 8 is a flowchart illustrating setting processing of a proper tilt angle according to a second embodiment.

Referring now to FIG. 8, a description will be given of the proper tilt angle setting processing of the surveillance camera 1000. FIG. 8 is a flowchart illustrating the setting processing of the proper tilt angle according to this embodiment. The system control unit 1003 mainly execute each step in FIG. 8. Since the steps S7000 to S7004 and S7006 in FIG. 8 correspond to the steps S6000 to S6004 and S6006 in FIG. 7 in the first embodiment, a description thereof will be omitted.

In the step S7005, the system control unit 1003 determines whether or not the ratios of the contrast evaluation values $U\theta_{n+1}$ and $L\theta_{n+1}$ in the upper and lower contrast evaluation areas 2007 and 2008 of the short-distance object are equal to each other, using the following expression (5).

$$|U\theta_{n+1} - L\theta_{n+1}| < t_2 \quad (5)$$

The expression (5) is a discriminant for determining whether or not the ratios of the contrast evaluation values $U\theta_{n+1}$ and $L\theta_{n+1}$ are equal to each other or whether or not the difference between the contrast evaluation value $U\theta_{n+1}$ and the contrast evaluation value $L\theta_{n+1}$ is smaller than the threshold value (second threshold value) $t_2$. The contrast evaluation values $U\theta_{n+1}$ and $L\theta_{n+1}$ of the upper and lower contrast evaluation areas 2007 and 2008 of the short-distance object are not necessarily equal to each other. Thus, in this embodiment, the left side of the expression (5) is set to an empirically determined threshold value $t_2$ which is a positive real number close to 0 instead of 0. If the expression (5) is not satisfied, the flow proceeds to the step S7006. If the expression (5) is satisfied, the flow proceeds to the step S7007.

If the expression (4) is satisfied in the step S7006, the system control unit 1003 considers the sum $A\theta_{n+1} + B\theta_{n+1}$ of the contrast evaluation values maximized, and proceeds to the step S7007. If the expression (4) is not satisfied, the flow proceeds to the step S7002. In the step S7002, the system control unit 1003 sets $\theta_{n+1}$ to the next $\theta_n$, and repeats the processing of the steps S7002 to S7005 until the conditions of steps S7005 and S7006 are satisfied.

In the step S7007, the system control unit 1003 determines as a proper tilt angle the tilt angle $\theta_{n+1}$ that maximizes the sum of the contrast evaluation values in the contrast evaluation areas 2005 and 2006 of the long-distance and short-distance objects. The system control unit 1003 sets the tilt angle of the image sensor driver 1008 to $\theta_{n+1}$ via the image sensor control unit 1009, and terminates the tilt angle setting processing.

In this embodiment, similarly to the first embodiment, the surveillance camera 1000 sets the upper and lower contrast evaluation areas which are obtained by vertically dividing the contrast evaluation area of the short-distance object, in addition to the contrast evaluation areas of the long-distance and short-distance objects. The system control unit 1003 adjusts the tilt angle of the image sensor (image capturer 1001) in a direction that maximizes the sum of the contrast evaluation values in the contrast evaluation areas 2005 and 2006 of the long-distance and short-distance objects. When the sum of the contrast evaluation values is maximized, the system control unit 1003 determines the tilt angle at that time as the proper tilt angle.

At this time, the system control unit 1003 compares with each other the contrast evaluation values $U\theta_{n+1}$ and $L\theta_{n+1}$ in the upper and lower contrast evaluation areas 2007 and 2008 of the short-distance object. If the ratios of the contrast evaluation values $U\theta_{n+1}$ and $L\theta_{n+1}$ in the contrast evaluation areas 2007 and 2008 are equal to each other (if the difference between the contrast evaluation values $U\theta_{n+1}$ and $L\theta_{n+1}$ is smaller than the threshold value $t_2$), the tilt angle is determined as the proper tilt angle. Thereby, it is possible to automatically set the tilt angle that suppresses the blur peculiar to the tilt which appears in the short-distance object 2003.

In this embodiment, the contrast evaluation area of the short-distance object can be divided in an arbitrary direction including the vertical or horizontal direction with respect to the captured image. Namely, this embodiment can automatically set the tilt angle that suppresses the blur peculiar to the tilt which appears in the short-distance object 2003, in consideration of the ratio of the contrast evaluation areas which are divided in an arbitrary direction.

Third Embodiment

Next follows a description of a third embodiment according to the present invention. This embodiment sets a proper F-number, after setting the proper tilt angle in the first or second embodiment. That is, after setting the proper tilt angle, this embodiment reduces an aperture of the diaphragm step by step and sets, to the proper F-number, the F-number when the sum of the contrast evaluation values in the upper and lower contrast evaluation areas of the short-distance object is maximized.

Figure 9:
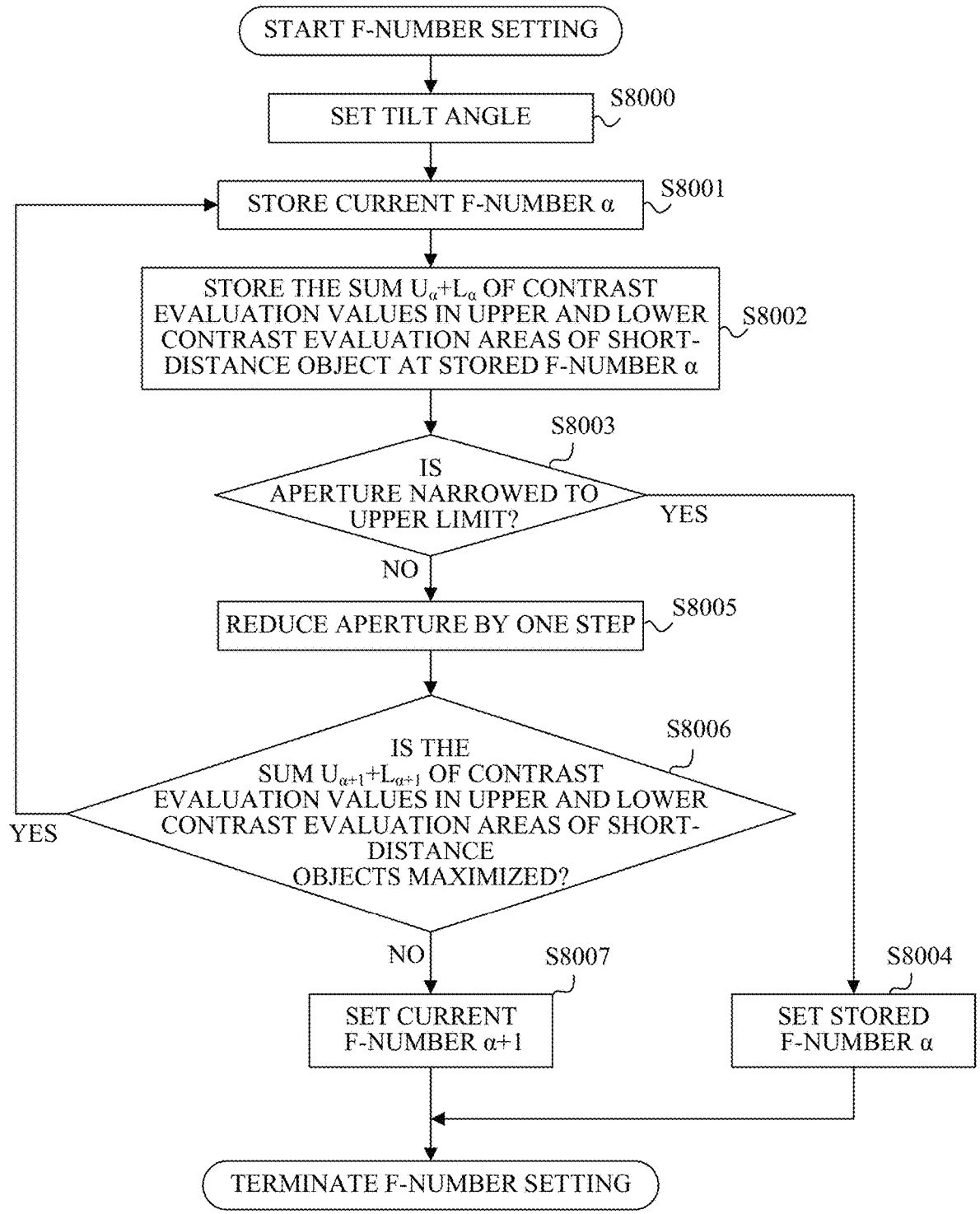
FIG. 9 is a flowchart illustrating setting processing of a proper F-number (aperture value) according to a third embodiment.

Referring now to FIG. 9, a description will be given of the setting processing of the proper F-number after setting the proper tilt angle in the surveillance camera 1000. FIG. 9 is a flowchart illustrating the proper F-number setting processing according to this embodiment. The system control unit 1003 mainly executes each step in FIG. 9.

Initially, in the step S8000, the system control unit 1003 sets the tilt angle (proper tilt angle) that suppresses the blur peculiar to the tilt which appears in the short-distance object using the method of the first or second embodiment. Next, in the step S8001, the system control unit 1003 stores a current F-number α. Next, in the step S8002, the system control unit 1003 stores the sum $U_\alpha + L_\alpha$ of the contrast evaluation values in the upper and lower contrast evaluation areas 2007 and 2008 of the short-distance object at the stored F-number α.

In the step S8003, the system control unit 1003 determines whether or not the aperture of the diaphragm has already been narrowed to the upper limit. If the aperture is not narrowed to the upper limit, the flow proceeds to the step S8005. If the aperture has already been narrowed to the upper limit, the flow proceeds to the step S8004. In the step S8004, the system control unit 1003 sets the F-number α stored in the step S8001 to the proper F-number in the diaphragm driver 1010 via the diaphragm controller 1011.

In the step S8005, the system control unit 1003 sets a F-number α+1, which is narrowed by one step from the current F-number α, in the diaphragm driver 1010 via the diaphragm controller 1011. Next, in the step S8006, the system control unit 1003 determines whether or not the sum $U_{\alpha+1} + L_{\alpha+1}$ of the contrast evaluation values in the upper and lower contrast evaluation areas 2007 and 2008 of the short-distance object is maximized using a following expression (6).

$$|(U_{\alpha+1} + L_{\alpha+1}) - (U_\alpha + L_\alpha)| < t_3 \quad (6)$$

In the expression (6), $t_3$ is a contrast variation amount threshold value (third threshold value) which is a condition for terminating a diaphragm adjustment. The threshold value $t_3$ is a positive real number close to 0 and is determined empirically. The expression (6) is a discriminant for determining whether or not the absolute value of the difference between the sum of the contrast evaluation values $U_{\alpha+1}+L_{\alpha+1}$ at the F-number $\alpha+1$ and the sum of the contrast evaluation values $U_\alpha+L_\alpha$ at the F-number $\alpha$ before it is changed to the F-number $\alpha+1$ is smaller than the threshold value $t_3$. If the expression (6) is satisfied, the system control unit 1003 considers the sum of the contrast evaluation values $U_{\alpha+1}+L_{\alpha+1}$ maximized, and proceeds to the step S8007. On the other hand, if the expression (6) is not satisfied, the flow proceeds to the step S8001.

In the step S8007, the system control unit 1003 sets the stored F-number $\alpha+1$ to the proper F-number and sets it to the diaphragm driver 1010 via the diaphragm controller 1011.

After determining the proper tilt angle by the method of the first or second embodiment, this embodiment narrows the aperture in the diaphragm step by step, and sets the F-number to the proper F-number when the sum of the contrast evaluation values in the upper and lower contrast evaluation areas of the short-distance object is maximized. Thereby, in addition to the automatic setting of the proper tilt angle according to the first and second embodiments, it is possible to further suppress the blur peculiar to the tilt which appears in the short-distance object.

In each embodiment, the control unit (system control unit 1003) includes the setting unit 1003a and the angle control unit 1003b. The setting unit 1003a sets the evaluation area (contrast evaluation area) in the image (captured image). The angle control unit 1003b adjusts the tilt angle based on the evaluation value (contrast evaluation value) of the evaluation area. The setting unit 1003a sets a first evaluation area (contrast evaluation area 2005) relating to the first object (long-distance object 2001) and the second evaluation area (contrast evaluation area 2006) relating to the second object (short-distance object 2003) which is closer than the first object. The setting unit 1003a sets the first partial evaluation area (contrast evaluation area 2007) and the second partial evaluation area (contrast evaluation area 2008) which are obtained by dividing the second evaluation area. The angle control unit 1003b adjusts the tilt angle so that the sum of the first evaluation value (A) in the first evaluation area and the second evaluation value (B) in the second evaluation area increases. The angle control unit 1003b sets the tilt angle based on the third evaluation value (U) in the first partial evaluation area and the fourth evaluation value (L) in the second partial evaluation area.

The angle control unit 1003b may set the tilt angle based on the first evaluation value, the second evaluation value, the third evaluation value, and the fourth evaluation value. The angle control unit 1003b may calculate the first variation amount ($A\theta_{n+1}-A\theta_n$) of the first evaluation value, the second variation amount ($B\theta_{n+1}-B\theta_n$) of the second evaluation value, the third variation amount ($U\theta_n-U\theta_{n+1}$) of the third evaluation value and a fourth variation amount ($L\theta_n-L\theta_{n+1}$) of the fourth evaluation value. The angle control unit 1003b sets the tilt angle based on the first variation amount, the second variation amount, the third variation amount, and the fourth variation amount. The angle control unit 1003b may set the tilt angle based on whether or not the absolute value of the sum of the third variation amount and the fourth variation amount is larger than the absolute value of the sum of the first variation amount and the second variation amount. The angle control unit 1003b may set the first angle ($\theta_n$) as the tilt angle when the absolute value of the sum of the third variation amount and the fourth variation amount is larger than the absolute value of the sum of the first variation amount and the second variation amount. The angle control unit 1003b sets the second angle ($\theta_{n+1}$) as the tilt angle when the sum of the first evaluation value and the second evaluation value is maximized.

The angle control unit 1003b may set the tilt angle based on whether or not the difference between the third evaluation value ($U\theta_{n+1}$) and the fourth evaluation value ($L\theta_{n+1}$) is smaller than the threshold value $t_2$.

The angle control unit 1003b may set the angle when the difference between the third evaluation value and the fourth evaluation value is smaller than the threshold value, or when the sum of the first evaluation value and the second evaluation value is maximized.

The control unit may include the diaphragm control unit 1003c that controls the diaphragm. The diaphragm control unit 1003c controls the diaphragm so as to reduce the aperture after the angle control unit 1003b has set the angle. The diaphragm control unit 1003c sets the aperture value (F-number) when the sum of the third evaluation value and the fourth evaluation value is maximized. The setting unit 1003a may set the third evaluation area and the fourth evaluation area by dividing the second evaluation area in a predetermined direction (arbitrary direction). The setting unit 1003a may set each of the first evaluation area and the second evaluation area based on the user operation or automatically. The setting unit 1003a may be able to change the shapes (rectangular shape, other shapes, etc.) of the first evaluation area and the second evaluation area.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory apparatus, a memory card, and the like.

For an imaging apparatus including a tilt driver of the image sensor, each embodiment can automatically set the tilt angle (proper tilt angle) that suppresses the blur peculiar to the tilt which appears in the short-distance object. Hence, each embodiment can provide the control apparatus, the imaging apparatus, and the storage medium that can suppress the blur occurring when adjusting the tilt angle.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-244128, filed on Dec. 27, 2018 which is hereby incorporated by reference herein in its entirety

What is claimed is:

1. A control apparatus comprising:
   a setting unit configured to set an evaluation area in an image; and
   an angle control unit configured to adjust a tilt angle based on an evaluation value in the evaluation area,
   wherein the setting unit sets a first evaluation area which relates to a first object, a second evaluation area which relates to a second object that is closer than the first object, and a first partial evaluation area and a second partial evaluation area both of which are obtained by dividing the second evaluation area,
   wherein the angle control unit adjusts the tilt angle so as to increase a sum of a first evaluation value in the first evaluation area and a second evaluation value in the second evaluation area,
   wherein the angle control unit sets the tilt angle based on a third evaluation value in the first partial evaluation area and a fourth evaluation value in the second partial evaluation area, and
   wherein at least one processor or circuit is configured to perform a function of at least one of the units.

2. The control apparatus according to claim 1, wherein the angle control unit sets the tilt angle based on the first evaluation value, the second evaluation value, the third evaluation value, and the fourth evaluation value.

3. The control apparatus according to claim 2, wherein the angle control unit sets the tilt angle based on a first variation amount of the first evaluation value, a second variation amount of the second evaluation value, a third variation amount of the third evaluation value, and a fourth variation amount of the fourth evaluation value.

4. The control apparatus according to claim 3, wherein the angle control unit sets the tilt angle based on whether an absolute value of the sum of the third variation amount and the fourth variation amount is larger than an absolute value of the sum of the first variation amount and the second variation amount.

5. The control apparatus according to claim 4, wherein the angle control unit sets a first angle to the tilt angle when an absolute value of a sum of the third variation amount and the fourth variation amount is larger than an absolute value of the sum of the first variation amount and the second variation amount, and
   wherein the angle control unit sets a second angle to the tilt angle when the sum of the first evaluation value and the second evaluation value is maximized.

6. The control apparatus according to claim 1, wherein the angle control unit sets the tilt angle based on whether a difference between the third evaluation value and the fourth evaluation value is smaller than a threshold value.

7. The control apparatus according to claim 6, wherein the angle control unit sets the tilt angle when the difference between the third evaluation value and the fourth evaluation value is smaller than the threshold value or when the sum of the first evaluation value and the second evaluation value is maximized.

8. The control apparatus according to claim 1, further comprising a diaphragm control unit configured to control a diaphragm,
   wherein the diaphragm control unit controls the diaphragm so as to narrow an aperture in the diaphragm after the angle control unit sets the tilt angle, and
   wherein the diaphragm control unit sets an F-number when the sum of the third evaluation value and the fourth evaluation value is maximized.

9. The control apparatus according to claim 1, wherein the setting unit sets the third evaluation area and the fourth evaluation area by dividing the second evaluation area in a predetermined direction.

10. The control apparatus according to claim 1, wherein the setting unit sets each of the first evaluation area and the second evaluation area based on a user operation or automatically.

11. The control apparatus according to claim 1, wherein the setting unit is configured to change shapes of the first evaluation area and the second evaluation area.

12. An imaging apparatus comprising:
    an image sensor configured to perform photoelectric conversion of an optical image which is formed through an imaging optical system; and
    a control apparatus,
    wherein the control apparatus includes:
    a setting unit configured to set an evaluation area in an image; and
    an angle control unit configured to adjust a tilt angle based on an evaluation value in the evaluation area,
    wherein the setting unit sets a first evaluation area which relates to a first object, a second evaluation area which relates to a second object that is closer than the first object, and a first partial evaluation area and a second partial evaluation area both of which are obtained by dividing the second evaluation area,
    wherein the angle control unit adjusts the tilt angle so as to increase a sum of a first evaluation value in the first evaluation area and a second evaluation value in the second evaluation area, and
    wherein the angle control unit sets the tilt angle based on a third evaluation value in the first partial evaluation area and a fourth evaluation value in the second partial evaluation area.

13. A non-transitory computer-readable storage medium storing a computer program that causes a computer to execute a control method,
    wherein the control method comprising:
    a setting step configured to set an evaluation area in an image; and
    an angle control step configured to adjust a tilt angle based on an evaluation value in the evaluation area,
    wherein the setting step sets a first evaluation area which relates to a first object, a second evaluation area which relates to a second object that is closer than the first object, and a first partial evaluation area and a second partial evaluation area both of which are obtained by dividing the second evaluation area,
    wherein the angle control step adjusts the tilt angle so as to increase a sum of a first evaluation value in the first evaluation area and a second evaluation value in the second evaluation area, and wherein the angle control step sets the tilt angle based on a third evaluation value in the first partial evaluation area and a fourth evaluation value in the second partial evaluation area.

\* \* \* \* \*